C. GLUUD,
Assignor to Lichtenstein Bros.
CIGAR-BOX.
No. 7,707. Reissued May 29, 1877.
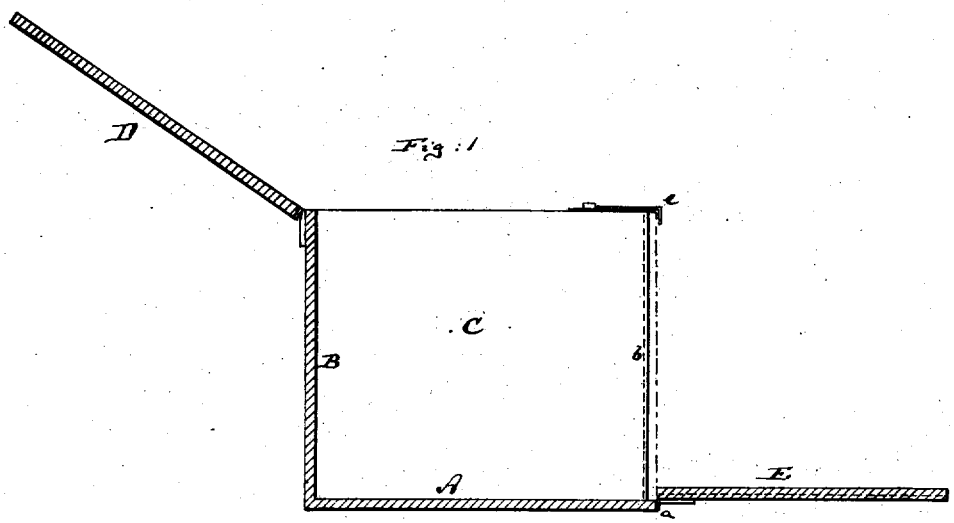
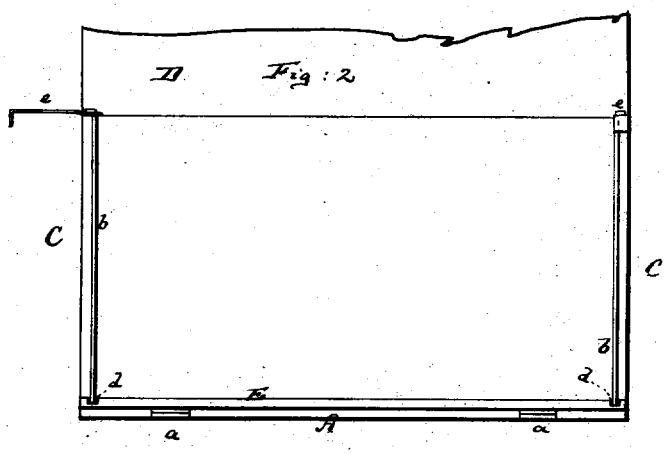
Witnesses
John G. Turnbridge.
A. V. Briesen
Inventor:
Carl Gluud.
by his attorney
A. V. Briesen
N. PETERS, PHOTO-LITHOGRAPHER, WASHINGTON, D. C.

UNITED STATES PATENT OFFICE.

CARL GLUUD, OF NEW YORK, N. Y., ASSIGNOR, BY MESNE ASSIGNMENTS, TO LICHTENSTEIN BROS. & CO., OF SAME PLACE.

IMPROVEMENT IN CIGAR-BOXES.

Specification forming part of Letters Patent No. 184,039, dated November 7, 1876; reissue No. 7,707, dated May 29, 1877; application filed April 3, 1877.

*To all whom it may concern:*

Be it known that I, CARL GLUUD, of New York city, N. Y., have invented a new and useful Improvement in Cigar-Boxes, of which the following is a specification:

Figure 1 is a cross-section of my improved box, showing the front folded down and the cover open. Fig. 2 is a front view of the same.

Similar letters of reference indicate corresponding parts in both figures.

This invention relates to an improvement on a cigar-box of that kind, which has a folding front, and a folding cover.

The invention consists in applying to the ends of the box pivoted catches, which lap over and hold the front of the box closed, and which are underneath the cover, so as not to interfere with the opening or closing thereof.

In the drawing, the letter A represents the bottom, B the back, C C the ends, of a cigar-box. These parts are rigidly connected in the customary manner of making cigar-boxes. D is the cover of the box, hinged to the rigid back in the usual manner. E is the front board of the box. Said front is, by flexible bands *a*, or otherwise, hinged to the front edge of the bottom of the box, so that it can be folded down, as by full lines in Fig. 1, or folded up against the ends C C, as by dotted lines in Fig. 1. When folded down it exposes the ends of the cigars contained in the box to view. I prefer to provide the front edges of the end boards C C with projecting tongues *b* that enter corresponding grooves *d* in the inner face of the front E; but such tongues and grooves may be dispensed with in view of the application of the L shaped catches *e e*. These catches are made of flat sheet metal, and pivoted to the upper edges of the end boards C in such a way that their turned-down front parts may lap over the face of the closed front E. The catches *e e* then serve to hold the front closed against the box; but they can be swung aside, as indicated at the left-hand side of Fig. 2, to allow the front to be let down.

The cover, when closed partly covers the catches *e*. They can be moved aside to let the front down while the cover remains closed, and the cover can be moved up and down while the front remains locked by the catches.

In place of the particular style of L-shaped catches shown, other equivalent catches may be employed.

I claim as my invention—

A cigar-box, having the folding front E and folding cover D combined with the pivoted catches *e*, that connect the ends C of the box with the folding front, so that the front cannot be folded down, when locked by said catches, which catches do not interfere with the motion of the cover, substantially as herein shown and described.

Signed this 16th day of March, 1877.

CARL GLUUD.

Witnesses:
ERNEST C. WEBB,
F. V. BRIESEN.